United States Patent
Akihisa

(10) Patent No.: US 8,596,233 B2
(45) Date of Patent: Dec. 3, 2013

(54) SPARK IGNITION TYPE INTERNAL COMBUSTION ENGINE

(75) Inventor: Daisuke Akihisa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 710 days.

(21) Appl. No.: 12/674,579

(22) PCT Filed: Nov. 5, 2008

(86) PCT No.: PCT/JP2008/070532
§ 371 (c)(1),
(2), (4) Date: Feb. 22, 2010

(87) PCT Pub. No.: WO2009/060977
PCT Pub. Date: May 14, 2009

(65) Prior Publication Data
US 2011/0041811 A1    Feb. 24, 2011

(30) Foreign Application Priority Data

Nov. 6, 2007   (JP) .................................. 2007-288976

(51) Int. Cl.
F02B 75/04    (2006.01)
(52) U.S. Cl.
USPC ................... 123/78 C; 123/90.15; 123/90.16; 123/90.17; 123/90.18; 123/48 A; 123/48 B; 123/48 C; 123/48 D; 123/48 R; 123/193.6
(58) Field of Classification Search
USPC ............... 123/48 A–48 D, 48 R, 193.6, 78 C, 123/90.15–90.18
See application file for complete search history.

(56) References Cited

U.S. PATENT DOCUMENTS

| | | | |
|---|---|---|---|
| 6,276,334 B1 | 8/2001 | Flynn et al. | |
| 6,675,087 B2 * | 1/2004 | Cullen | 701/110 |
| 7,152,578 B2 * | 12/2006 | Yui | 123/348 |
| 7,324,889 B2 * | 1/2008 | Arai et al. | 701/103 |
| 7,802,543 B2 * | 9/2010 | Akihisa et al. | 123/48 R |
| 8,229,649 B2 * | 7/2012 | Akihisa | 701/103 |
| 2002/0166527 A1 * | 11/2002 | Takahashi et al. | 123/90.17 |
| 2004/0194748 A1 * | 10/2004 | Asai et al. | 123/90.17 |
| 2006/0070605 A1 * | 4/2006 | Akihisa et al. | 123/478 |
| 2010/0175644 A1 * | 7/2010 | Shinagawa et al. | 123/90.15 |

FOREIGN PATENT DOCUMENTS

| | | |
|---|---|---|
| JP | A-5-231197 | 9/1993 |
| JP | A-2000-513788 | 10/2000 |
| JP | A-2001-159329 | 6/2001 |
| JP | A-2004-218522 | 8/2004 |

OTHER PUBLICATIONS

International Search Report for International Application No. PCT/JP2008/070532, issued Dec. 9, 2008.

* cited by examiner

*Primary Examiner* — Marguerite McMahon
*Assistant Examiner* — James Kim
(74) *Attorney, Agent, or Firm* — Oliff & Berridge, PLC

(57) ABSTRACT

In an internal combustion engine, a variable compression ratio mechanism able to change a mechanical compression ratio and a variable valve timing mechanism able to change a closing timing of an intake valve are provided. When a load is higher than a predetermined load, an amount of intake air inside a combustion chamber is controlled by controlling the closing timing of the intake valve, while when the engine load is lower than the predetermined load, the amount of intake air inside the combustion chamber is controlled by controlling both the closing timing of the intake valve and the opening degree of the throttle valve.

2 Claims, 9 Drawing Sheets

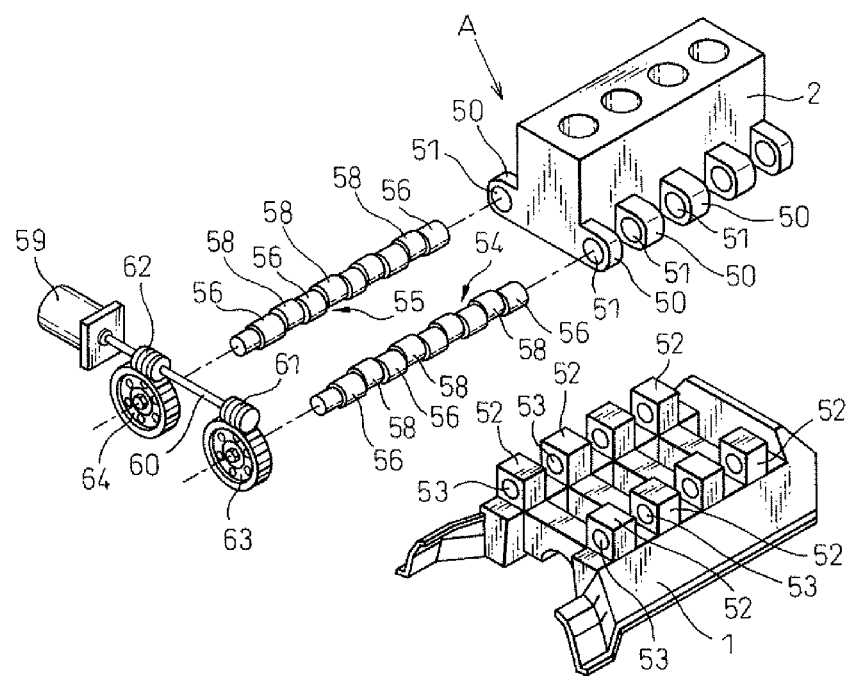
Fig.2
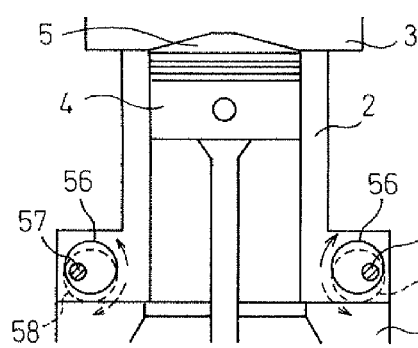
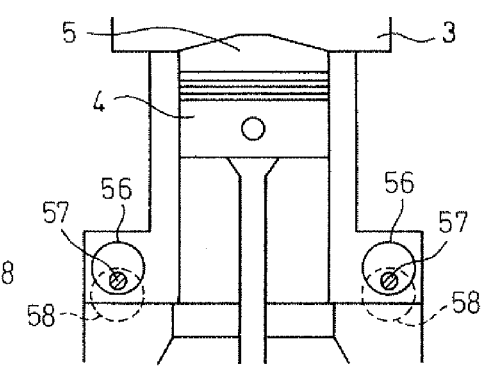
Fig.3

Fig.6
(A)
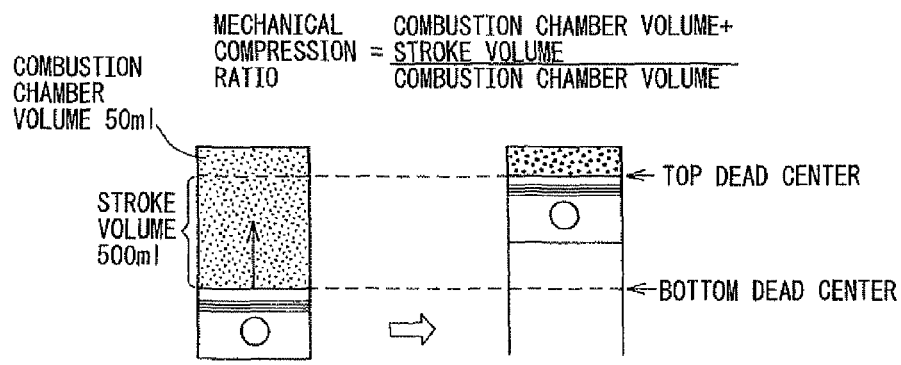
(B)
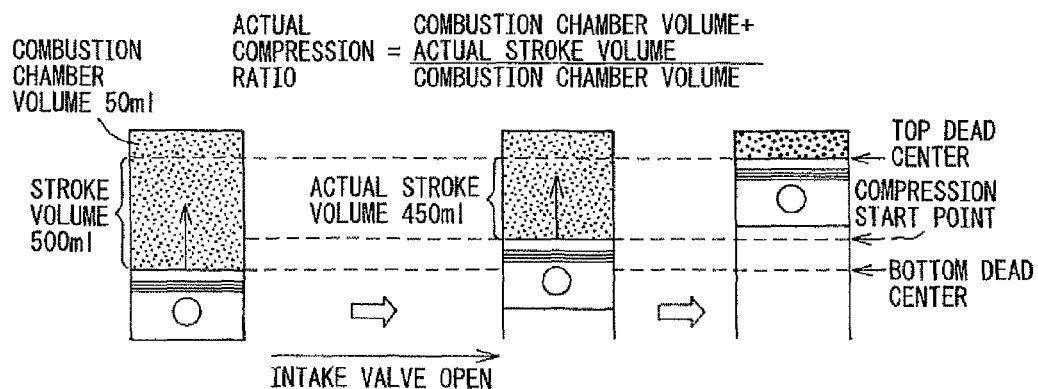
(C)
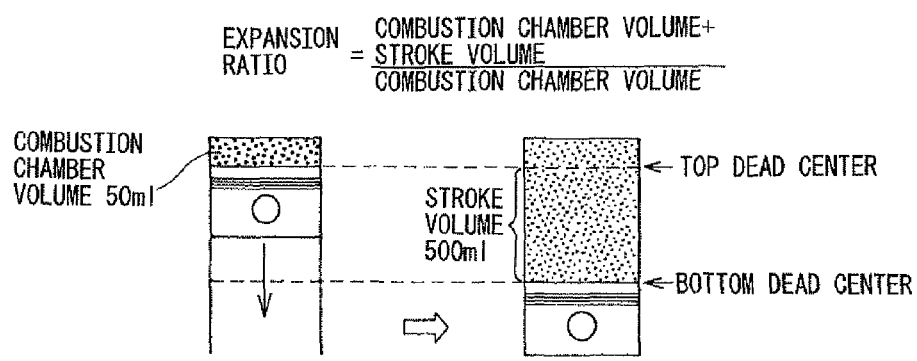

Fig.11
(A)
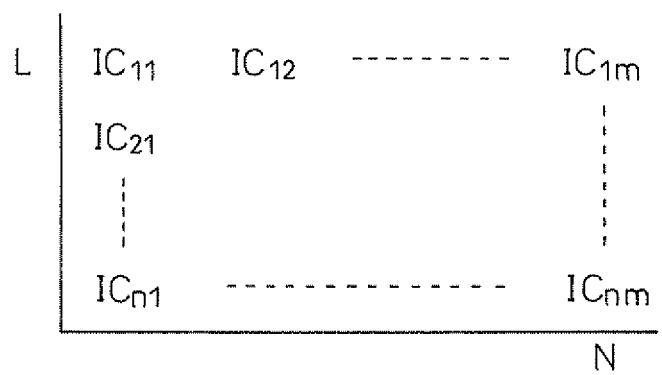
(B)
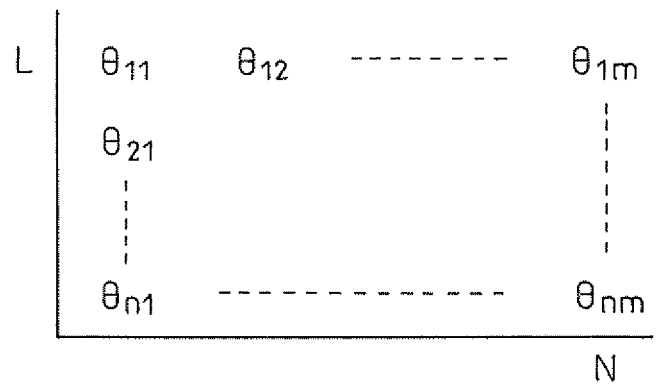

US 8,596,233 B2

SPARK IGNITION TYPE INTERNAL COMBUSTION ENGINE

TECHNICAL FIELD

The present invention relates to a spark ignition type internal combustion engine.

BACKGROUND ART

Known in the art is a spark ignition type internal combustion engine provided with a variable compression ratio mechanism able to change a mechanical compression ratio and a variable valve timing mechanism able to control a closing timing of an intake valve, performing a supercharging action by a supercharger at the time of engine medium load operation and engine high load operation, and increasing the mechanical compression ratio and delaying the closing timing of the intake valve as the engine load becomes lower at the time of engine medium and high load operation in the state holding the actual combustion ratio constant (for example, see Japanese Patent Publication (A) No. 2004-218522).

However this citation does not allude at all to control of the throttle valve.

DISCLOSURE OF THE INVENTION

An object of the present invention is to provide a spark ignition type internal combustion engine able to improve a thermal efficiency and secure a good combustion.

According to the present invention, there is provided a spark ignition type internal combustion engine provided with a variable compression ratio mechanism able to change a mechanical compression ratio, a variable valve timing mechanism able to control a closing timing of an intake valve, and a throttle valve arranged in an engine intake passage for controlling an intake air amount, wherein, when n engine load is higher than a predetermined load, the closing timing of the intake valve is controlled to control an amount of intake air into a combustion chamber, while when the engine load is lower than the predetermined load, the closing timing of the intake valve and an opening degree of the throttle valve are both controlled to control the amount of intake air into the combustion chamber.

BRIEF DESCRIPTION OF THE DRAWINGS

FIG. 2 is a disassembled perspective view of a variable compression ratio mechanism.

FIG. 3 is a side cross-sectional view of the illustrated internal combustion engine.

FIG. 6 is a view for explaining the mechanical compression ratio, actual compression ratio, and expansion ratio.

FIG. 11 is a view showing maps of the closing timing of the intake valve etc.

BEST MODE FOR CARRYING OUT THE INVENTION

Figure 1:
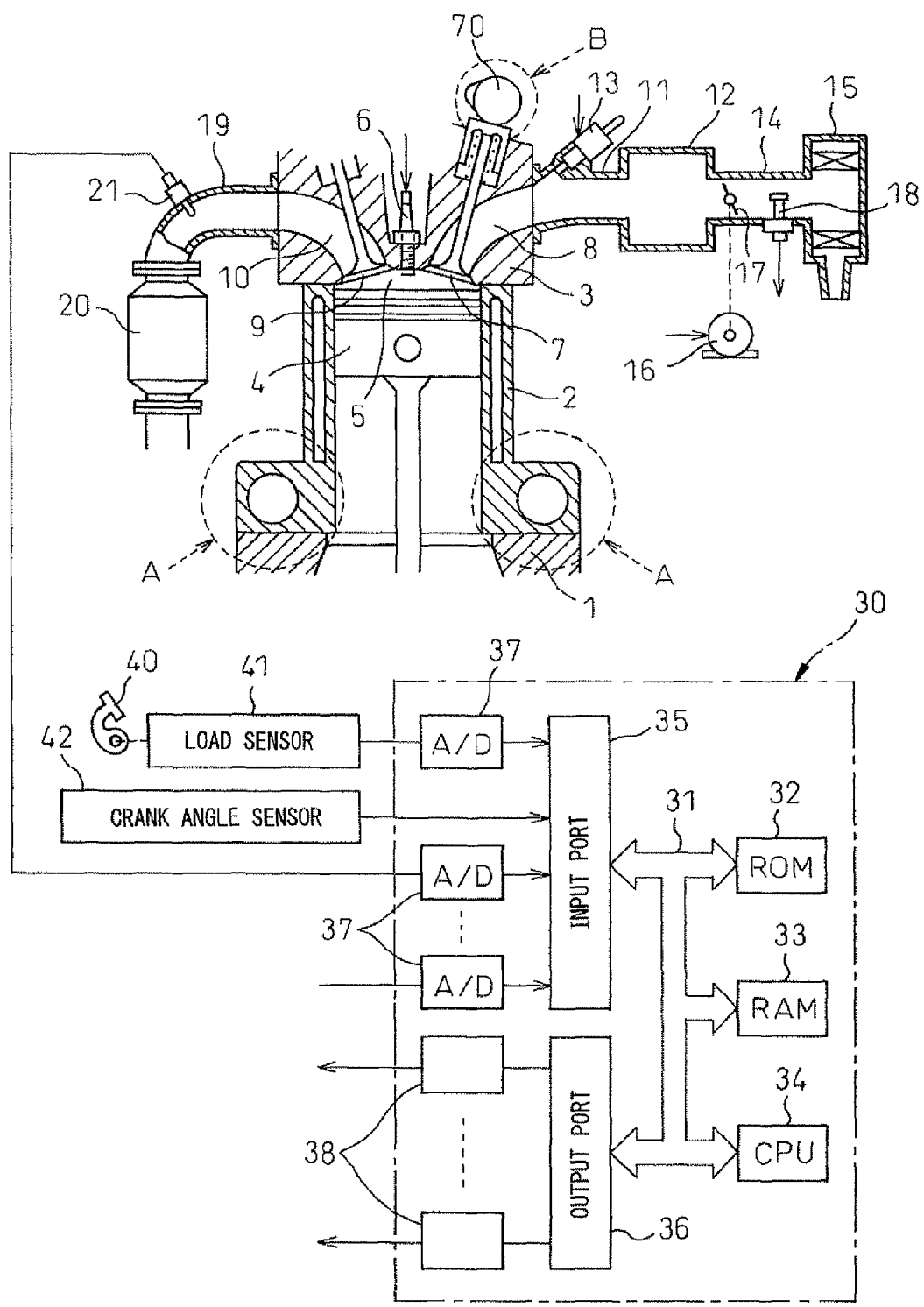
FIG. 1 is an overview of a spark ignition type internal combustion engine.

FIG. 1 shows a side cross-sectional view of a spark ignition type internal combustion engine.

Referring to FIG. 1, 1 indicates a crank case, 2 a cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. The intake port 8 is connected through an intake branch tube 11 to a surge tank 12, while each intake branch tube 11 is provided with a fuel injector 13 for injecting fuel toward a corresponding intake port 8. Note that each fuel injector 13 may be arranged at each combustion chamber 5 instead of being attached to each intake branch tube 11.

The surge tank 12 is connected through an intake duct 14 to an air cleaner 15, while the intake duct 14 is provided inside it with a throttle valve 17 driven by an actuator 16 and an intake air amount detector 18 using for example a hot wire. On the other hand, the exhaust port 10 is connected through an exhaust manifold 19 to a catalytic converter 20 housing for example a three-way catalyst, while the exhaust manifold 19 is provided inside it with an air-fuel ratio sensor 21.

On the other hand, in the embodiment shown in FIG. 1, the connecting part of the crank case 1 and the cylinder block 2 is provided with a variable compression ratio mechanism A able to change the relative positions of the crank case 1 and cylinder block 2 in the cylinder axial direction so as to change the volume of the combustion chamber 5 when the piston 4 is positioned at compression top dead center, and there is further provided with an actual compression action start timing changing mechanism B able to change a start timing of an actual compression action. Note that in the embodiment shown in FIG. 1, this actual compression action start timing changing mechanism B is comprised of a variable valve timing mechanism able to control the closing timing of the intake valve 7.

The electronic control unit 30 is comprised of a digital computer provided with components connected with each other through a bidirectional bus 31 such as a ROM (read only memory) 32, RAM (random access memory) 33, CPU (microprocessor) 34, input port 35, and output port 36. The output signal of the intake air amount detector 18 and the output signal of the air-fuel ratio sensor 21 are input through corresponding AD converters 37 to the input port 35. Further, the accelerator pedal 40 is connected to a load sensor 41 generating an output voltage proportional to the amount of depression L of the accelerator pedal 40. The output voltage of the load sensor 41 is input through a corresponding AD converter 37 to the input port 35. Further, the input port 35 is connected to a crank angle sensor 42 generating an output pulse every time the crankshaft rotates by for example 30°. On the other hand, the output port 36 is connected through the drive circuit 38 to a spark plug 6, fuel injector 13, throttle valve drive actuator 16, variable compression ratio mechanism A, and variable valve timing mechanism B.

FIG. 2 is a disassembled perspective view of the variable compression ratio mechanism A shown in FIG. 1, while FIG. 3 is a side cross-sectional view of the illustrated internal combustion engine. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 is provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, between the circular cams 56, as shown by the hatching in FIG. 3, extend eccentric shafts 57 arranged eccentrically with respect to the axes of rotation of the cam shafts 54, 55. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 fastened to the cam shafts 54, 55 are rotated in opposite directions as shown by the solid line arrows in FIG. 3(A) from the state shown in FIG. 3(A), the eccentric shafts 57 move toward the bottom center, so the circular cams 58 rotate in the opposite directions from the circular cams 56 in the cam insertion holes 53 as shown by the broken line arrows in FIG. 3(A). As shown in FIG. 3(B), when the eccentric shafts 57 move toward the bottom center, the centers of the circular cams 58 move to below the eccentric shafts 57.

As will be understood from a comparison of FIG. 3(A) and FIG. 3(B), the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 moves away from the crank case 1, the volume of the combustion chamber 5 when the piston 4 is positioned as compression top dead center increases, therefore by making the cam shafts 54, 55 rotate, the volume of the combustion chamber 5 when the piston 4 is positioned as compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55. In this embodiment, the drive motor 59 may be driven to change the volume of the combustion chamber 5 when the piston 4 is positioned at compression top dead center over a broad range. Note that the variable compression ratio mechanism A shown from FIG. 1 to FIG. 3 shows an example. Any type of variable compression ratio mechanism may be used.

Figure 4:
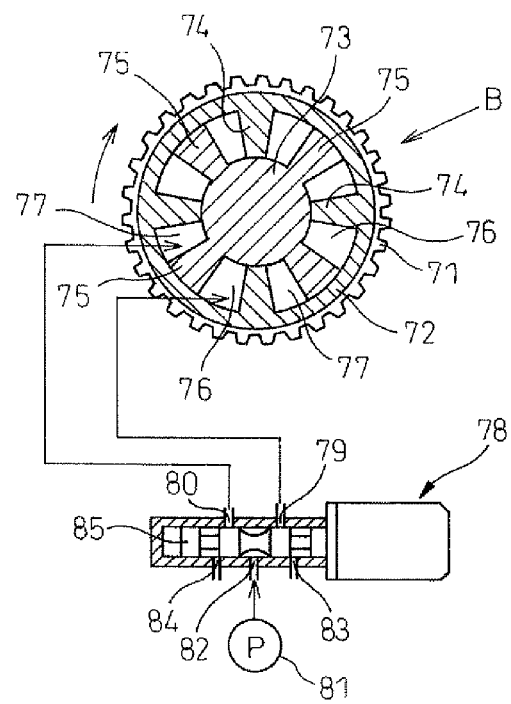
FIG. 4 is a view of a variable valve timing mechanism.

On the other hand, FIG. 4 shows a variable valve timing mechanism B attached to the end of the cam shaft 70 for driving the intake valve 7 in FIG. 1. Referring to FIG. 4, this variable valve timing mechanism B is provided with a timing pulley 71 rotated by an engine crank shaft through a timing belt in the arrow direction, a cylindrical housing 72 rotating together with the timing pulley 71, a shaft 73 able to rotate together with an intake valve drive cam shaft 70 and rotate relative to the cylindrical housing 72, a plurality of partitions 74 extending from an inside circumference of the cylindrical housing 72 to an outside circumference of the shaft 73, and vanes 75 extending between the partitions 74 from the outside circumference of the shaft 73 to the inside circumference of the cylindrical housing 72, the two sides of the vanes 75 formed with hydraulic chambers for advancing 76 and use hydraulic chambers for retarding 77.

The feed of working oil to the hydraulic chambers 76, 77 is controlled by a working oil feed control valve 78. This working oil feed control valve 78 is provided with hydraulic ports 79, 80 connected to the hydraulic chambers 76, 77, a feed port 82 for working oil discharged from a hydraulic pump 81, a pair of drain ports 83, 84 and a spool valve 85 for controlling connection and disconnection of the ports 79, 80, 82, 83, 84.

To advance the phase of the cams of the intake valve drive cam shaft 70, in FIG. 4, the spool valve 85 is made to move to the right, working oil fed from the feed port 82 is fed through the hydraulic port 79 to the hydraulic chambers for advancing 76, and working oil in the hydraulic chambers for retarding 77 is drained from the drain port 84. At this time, the shaft 73 is made to rotate relative to the cylindrical housing 72 in the arrow direction.

As opposed to this, to retard the phase of the cams of the intake valve drive cam shaft 70, in FIG. 4, the spool valve 85 is made to move to the left, working oil fed from the feed port 82 is fed through the hydraulic port 80 to the hydraulic chambers for retarding 77, and working oil in the hydraulic chambers for advancing 76 is drained from the drain port 83. At this time, the shaft 73 is made to rotate relative to the cylindrical housing 72 in the direction opposite to the arrows.

When the shaft 73 is made to rotate relative to the cylindrical housing 72, if the spool valve 85 is returned to the neutral position shown in FIG. 4, the operation for relative rotation of the shaft 73 is ended, and the shaft 73 is held at the relative rotational position at that time. Therefore, it is possible to use the variable valve timing mechanism B so as to advance or retard the phase of the cams of the intake valve drive cam shaft 70 by exactly the desired amount.

Figure 5:
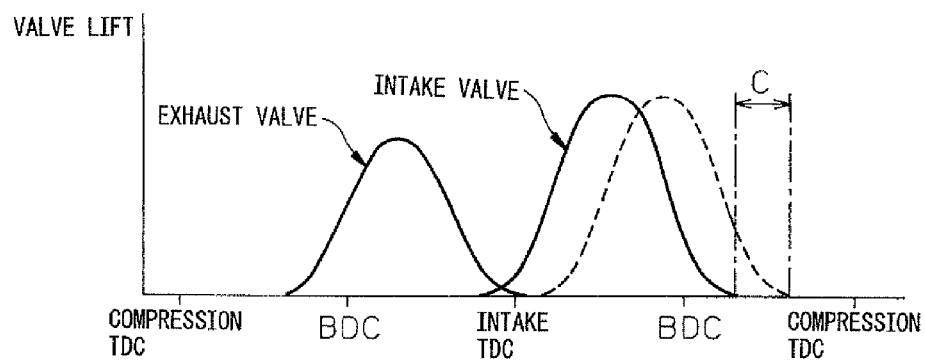
FIG. 5 is a view showing the amounts of lift of the intake valve and exhaust valve.

In FIG. 5, the solid line shows when the variable valve timing mechanism B is used to advance the phase of the cams of the intake valve drive cam shaft 70 the most, while the broken line shows when it is used to retard the phase of the cams of the intake valve drive cam shaft 70 the most. Therefore, the opening time of the intake valve 7 can be freely set between the range shown by the solid line in FIG. 5 and the range shown by the broken line, therefore the closing timing of the intake valve 7 can be set to any crank angle in the range shown by the arrow C in FIG. 5.

The variable valve timing mechanism B shown in FIG. 1 and FIG. 4 is one example. For example, a variable valve timing mechanism or other various types of variable valve timing mechanisms able to change only the closing timing of the intake valve while maintaining the opening timing of the intake valve constant can be used.

Next, the meaning of the terms used in the present application will be explained with reference to FIG. 6. Note that FIGS. 6(A), (B), and (C) show for explanatory purposes an engine with a volume of the combustion chambers of 50 ml and a stroke volume of the piston of 500 ml. In these FIGS. 6(A), (B), and (C), the combustion chamber volume shows the volume of the combustion chamber when the piston is at compression top dead center.

FIG. 6(A) explains the mechanical compression ratio. The mechanical compression ratio is a value determined mechanically from the stroke volume of the piston and combustion chamber volume at the time of a compression stroke. This mechanical compression ratio is expressed by (combustion chamber volumed+stroke volume)/combustion chamber volume. In the example shown in FIG. 6(A), this mechanical compression ratio becomes (50 ml+500 ml)/50 ml=11.

FIG. 6(B) explains the actual compression ratio. This actual compression ratio is a value determined from the actual stroke volume of the piston from when the compression action is actually started to when the piston reaches top dead center and the combustion chamber volume. This actual compression ratio is expressed by (combustion chamber volume+ actual stroke volume)/combustion chamber volume. That is, as shown in FIG. 6(B), even if the piston starts to rise in the compression stroke, no compression action is performed while the intake valve is opened. The actual compression action is started after the intake valve closes. Therefore, the actual compression ratio is expressed as follows using the actual stroke volume. In the example shown in FIG. 6(B), the actual compression ratio becomes (50 ml+450 ml)/50 ml=10.

FIG. 6(C) explains the expansion ratio. The expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 6(C), this expansion ratio becomes (50 ml+500 ml)/50 ml=11.

Next, the most basic features of the present invention will be explained with reference to FIG. 7 and FIG. 8. Note that FIG. 7 shows the relationship between the theoretical thermal efficiency and the expansion ratio, while FIG. 8 shows a comparison between the ordinary cycle and superhigh expansion ratio cycle used selectively in accordance with the load in the present invention.

FIG. 8(A) shows the ordinary cycle when the intake valve closes near the bottom dead center and the compression action by the piston is started from near substantially compression bottom dead center. In the example shown in this FIG. 8(A) as well, in the same way as the examples shown in FIGS. 6(A), (B), and (C), the combustion chamber volume is made 50 ml, and the stroke volume of the piston is made 500 ml. As will be understood from FIG. 8(A), in an ordinary cycle, the mechanical compression ratio is (50 ml+500 ml)/50 ml=11, the actual compression ratio is also about 11, and the expansion ratio also becomes (50 ml+500 ml)/50 ml=11. That is, in an ordinary internal combustion engine, the mechanical compression ratio and actual compression ratio and the expansion ratio become substantially equal.

Figure 7:
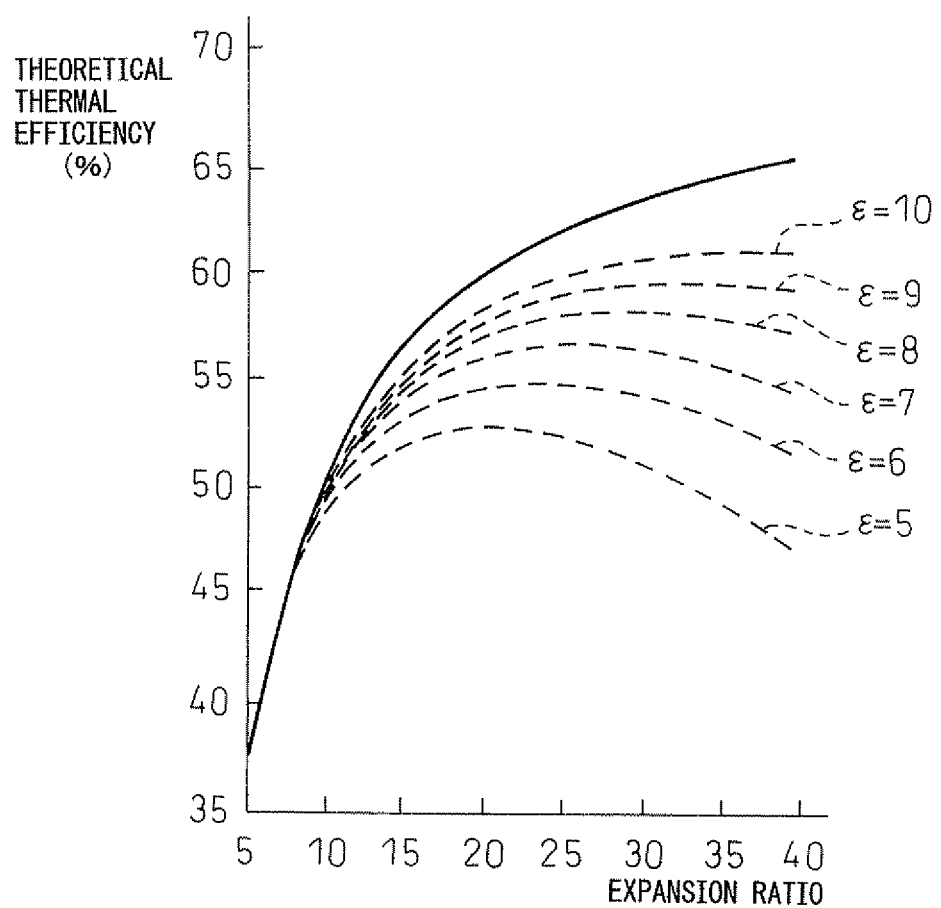
FIG. 7 is a view showing the relationship between the theoretical thermal efficiency and expansion ratio.
Figure 8:
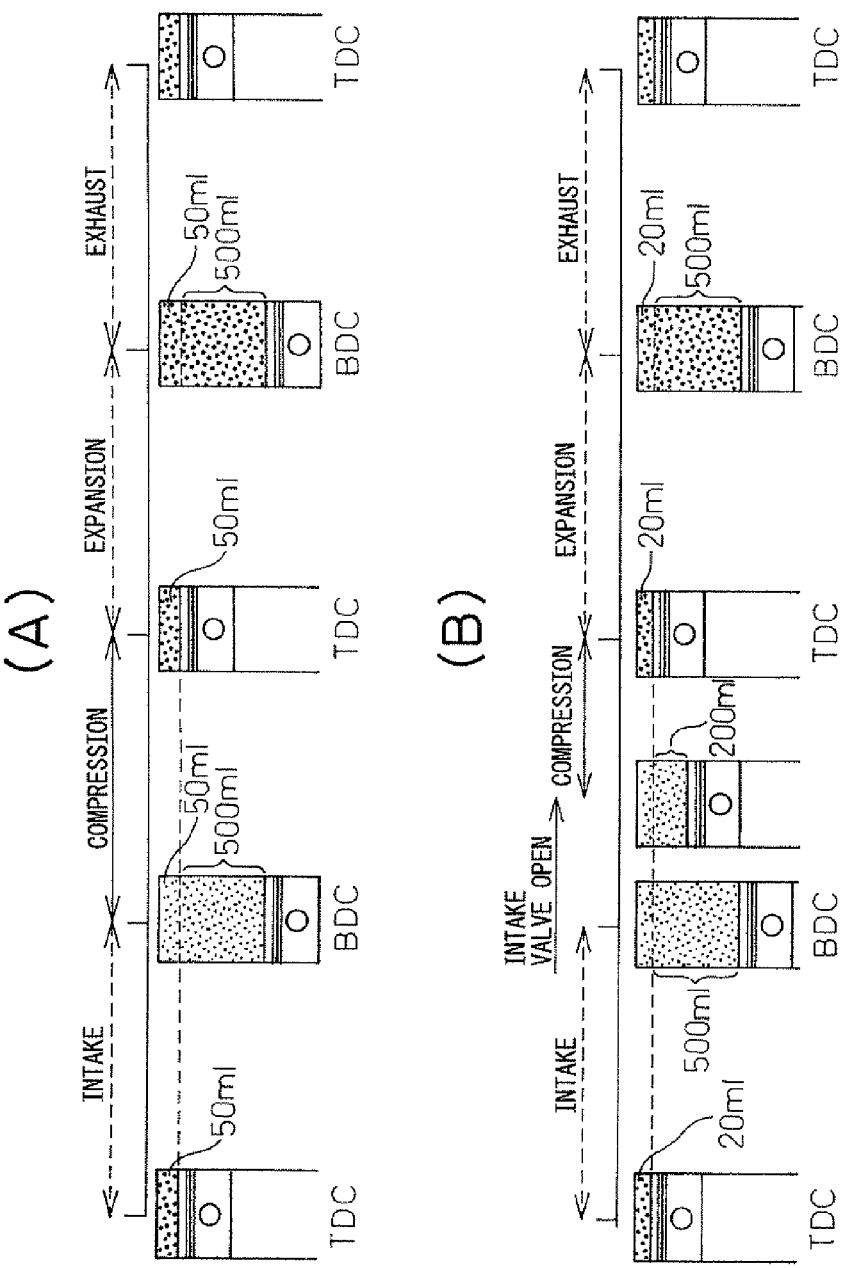
FIG. 8 is a view for explaining an ordinary cycle and superhigh expansion ratio cycle.

The solid line in FIG. 7 shows the change in the theoretical thermal efficiency in the case where the actual compression ratio and expansion ratio are substantially equal, that is, in the ordinary cycle. In this case, it is learned that the larger the expansion ratio, that is, the higher the actual compression ratio, the higher the theoretical thermal efficiency. Therefore, in an ordinary cycle, to raise the theoretical thermal efficiency, the actual compression ratio should be made higher. However, due to the restrictions on the occurrence of knocking at the time of engine high load operation, the actual compression ratio can only be raised even at the maximum to about 12, accordingly, in an ordinary cycle, the theoretical thermal efficiency cannot be made sufficiently high.

On the other hand, under this situation, the inventors strictly differentiated between the mechanical compression ratio and actual compression ratio and studied the theoretical thermal efficiency and as a result discovered that in the theoretical thermal efficiency, the expansion ratio is dominant, and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the expansion ratio, the longer the period during which a force acts pressing down the piston at the time of the expansion stroke, the longer the time that the piston gives a rotational force to the crankshaft. Therefore, the larger the expansion ratio is made, the higher the theoretical thermal efficiency becomes. The broken line $\epsilon=10$ in FIG. 7 shows the theoretical thermal efficiency in the case of fixing the actual compression ratio at 10 and raising the expansion ratio in that state. In this way, it is learned that the amount of rise of the theoretical thermal efficiency when raising the expansion ratio in the state where the actual compression ratio is maintained at a low value and the amount of rise of the theoretical thermal efficiency in the case where the actual compression ratio is increased along with the expansion ratio as shown by the solid line of FIG. 7 will not differ that much.

If the actual compression ratio is maintained at a low value in this way, knocking will not occur, therefore if raising the expansion ratio in the state where the actual compression ratio is maintained at a low value, the occurrence of knocking can be prevented and the theoretical thermal efficiency can be greatly raised. FIG. 8(B) shows an example of the case when using the variable compression ratio mechanism A and variable valve timing mechanism B to maintain the actual compression ratio at a low value and raise the expansion ratio.

Referring to FIG. 8(B), in this example, the variable compression ratio mechanism A is used to lower the combustion chamber volume from 50 ml to 20 ml. On the other hand, the variable valve timing mechanism B is used to delay the closing timing of the intake valve until the actual stroke volume of the piston changes from 500 ml to 200 ml. As a result, in this example, the actual compression ratio becomes (20 ml+200 ml)/20 ml=11 and the expansion ratio becomes (20 ml+500 ml)/20 ml=26. In the ordinary cycle shown in FIG. 8(A), as explained above, the actual compression ratio is about 11 and the expansion ratio is 11. Compared with this case, in the case shown in FIG. 8(B), it is learned that only the expansion ratio is raised to 26. This is the reason that it is called the "superhigh expansion ratio cycle".

As explained above, generally speaking, in an internal combustion engine, the lower the engine load, the worse the thermal efficiency, therefore to improve the thermal efficiency at the time of vehicle operation, that is, to improve the fuel consumption, it becomes necessary to improve the thermal efficiency at the time of engine low load operation. On the other hand, in the superhigh expansion ratio cycle shown in FIG. 8(B), the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, at the time of engine low load operation, the superhigh expansion ratio cycle shown in FIG. 8(B) is set, while at the time of engine high load operation, the ordinary cycle shown in FIG. 8(A) is set. This is the basic feature of the present invention.

Next, the operational control as a whole will be explained with reference to FIG. 9.

Figure 9:
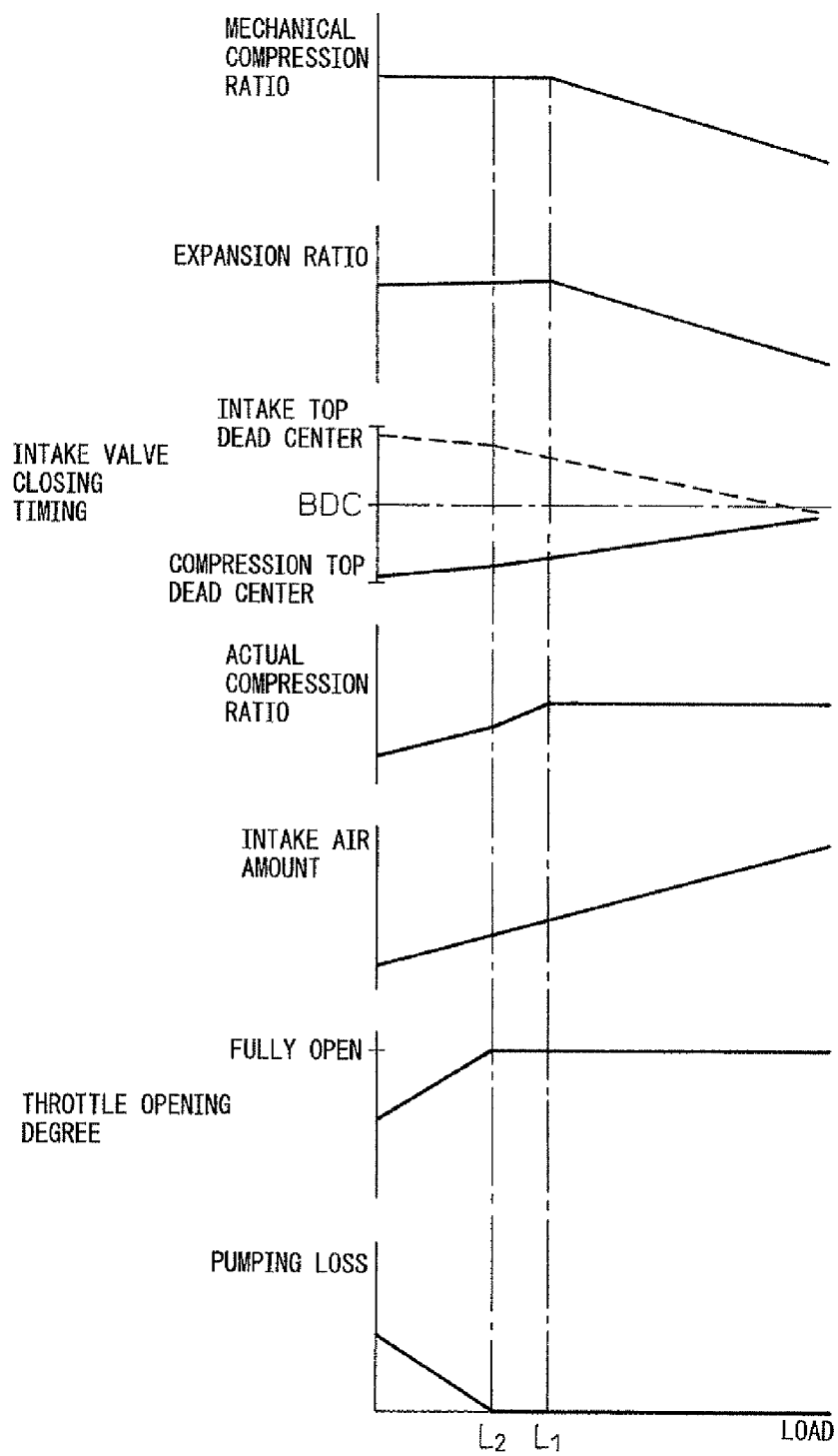
FIG. 9 is a view showing the change in mechanical compression ratio etc. in accordance with the engine load.

FIG. 9 shows the changes in the mechanical compression ratio, expansion ratio, closing timing of the intake valve 7, actual compression ratio, the amount of intake air, opening degree of the throttle valve 17, and pumping loss along with the engine load under a certain engine speed. Note that in the embodiment according to the present invention, ordinarily the average air-fuel ratio in the combustion chamber 5 is feedback controlled to the stoichiometric air-fuel ratio based on the output signal of the air-fuel ratio sensor 21 so that the three-way catalyst in the catalytic converter 20 can simultaneously reduce the unburned HC, CO, and $NO_x$ in the exhaust gas.

Now, as explained above, at the time of engine high load operation, the ordinary cycle shown in FIG. 8(A) is executed. Therefore, as shown in FIG. 9, at this time, since the mechanical compression ratio is made low, the expansion ratio becomes low. As shown by the solid line in low in FIG. 9, the closing timing of the intake valve 7 is advanced as shown by the solid line in FIG. 5. Further, at this time, the amount of intake air is large. At this time, the opening degree of the throttle valve 17 is maintained fully opened or substantially fully opened, so the pumping loss becomes zero.

On the other hand, as shown by a solid line in FIG. 9, if the engine load becomes lower, the closing timing of the intake valve 7 is retarded so as to reduce the intake air amount along with that. Further, at this time, the mechanical compression ratio is increased as the engine load becomes lower as shown in FIG. 9 so that the actual compression ratio is held substantially constant. Therefore, the expansion ratio is also increased as the engine load becomes lower. Note that, at this time as well, the throttle valve 17 is held in the fully open or substantially fully open state. Therefore, the amount of intake air supplied inside the combustion chamber 5 is controlled by changing the closing timing of the intake valve 7 regardless of the throttle valve 17. At this time as well, the pumping loss becomes zero.

In this way, when the engine load becomes lower from the engine high load operation state, the mechanical compression ratio is increased as the intake air amount is reduced under a substantially constant actual compression ratio. That is, the volume of the combustion chamber 5 when the piston 4 reaches compression top dead center is reduced in proportion to the reduction in the intake air amount. Therefore, the volume of the combustion chamber 5 when the piston 4 reaches compression top dead center changes in proportion to the intake air amount. Note that, at this time, the air-fuel ratio in the combustion chamber 5 becomes the stoichiometric air-fuel ratio, so the volume of the combustion chamber 5 when the piston 4 reaches compression top dead center changes in proportion to the amount of fuel.

If the engine load further falls, the mechanical compression ratio is further increased. If the engine load falls to a medium load $L_1$ somewhat close to the low load, the mechanical compression ratio reaches the limit mechanical compression ratio of the structural limit of the combustion chamber 5. If the mechanical compression ratio reaches the limit mechanical compression ratio, in the region where the load is lower than the engine load $L_1$ when the mechanical compression ratio reaches the limit mechanical compression ratio, the mechanical compression ratio is held at the limit mechanical compression ratio. Therefore, at the time of engine medium load operation at the low load side and at the time of engine low load operation, that is, at the engine low load operation side, the mechanical compression ratio becomes the maximum and the expansion ratio becomes the maximum. In other words, at the engine low load operation side, the mechanical compression ratio is made the maximum so that the maximum expansion ratio is obtained.

On the other hand, in the embodiment shown in FIG. 9, regardless of the engine load, as shown by the solid line in FIG. 9, the closing timing of the intake valve 7 is retarded as the engine load becomes lower. Further, in the embodiment shown in FIG. 9, in the load region where the mechanical compression ratio is maintained at the maximum mechanical compression ratio, a predetermined load $L_2$ is set. When the engine load is lower than the predetermined load $L_2$, the opening degree of the throttle valve 17 becomes smaller as the engine load becomes smaller. On the other hand, when the engine load is higher than the predetermined load $L_2$, the throttle valve 17 is held in the fully open state.

On the other hand, as shown in FIG. 9, when the engine load is higher than $L_1$, that is, at the engine high load operation side, the actual compression ratio is maintained at substantially the same actual compression ratio with respect to the same engine speed. As opposed to this, when the engine load is lower than $L_1$, that is, when the mechanical compression ratio is held at the limit mechanical compression ratio, the actual compression ratio is determined by the closing timing of the intake valve 7. As shown in FIG. 9, if the closing timing of the intake valve is retarded as the engine load becomes lower, the actual compression ratio falls the lower the engine load.

In this regard, the amount of intake air to the combustion chamber 5 can be controlled by controlling the closing timing of the intake valve 7 and can be controlled by controlling the opening degree of the throttle valve 17. In this regard, if trying to control the amount of intake air to the combustion chamber 5 by controlling only the closing timing of the intake valve 7 when the mechanical compression ratio is maintained at the maximum mechanical compression ratio, the actual compression ratio will fall as the engine load becomes lower. However in this way, if the actual compression ratio falls, the temperature inside the combustion chamber 5 at the combustion end falls and as a result the ignition and combustion of the fuel deteriorate.

On the other hand, if closing the throttle valve 17, the throttling action of the throttle valve 17 on the flow of intake air causes disturbances inside the combustion chamber 5 and therefore enables improvement of the ignition and combustion of the fuel. Therefore, if using the throttle valve 17 to control the amount of intake air to the combustion chamber 5, it becomes possible to improve the ignition and combustion of the fuel. However, if using the throttle valve 17 to control the amount of intake air to the combustion chamber 5, pumping loss occurs.

Therefore, if covering the deterioration of the ignition and combustion of the fuel caused by controlling the closing timing of the intake valve 7 by the closing action of the throttle valve 17, that is, if dividing the control of the amount of intake air to the combustion chamber between control of the closing timing of the intake valve 7 and control of the throttle valve 17, a good ignition and combustion with little pumping loss can be obtained. In this case, such control has to be performed when the actual compression ratio falls to a certain degree or more.

Therefore, in the present invention, when the engine load is higher than a predetermined load $L_2$, the closing timing of the intake valve 7 is controlled to control the amount of intake air to the combustion chamber 5, while when the engine load is lower than the predetermined load $L_2$, the closing timing of the intake valve 7 and the opening degree of the throttle valve 17 are both controlled to control the amount of intake air to the combustion chamber 5.

In this regard, as explained above, in the superhigh expansion ratio cycle shown in FIG. 8(B), the expansion ratio is made 26. The higher this expansion ratio, the better, but as will be understood from FIG. 7, if 20 or more, a considerably high theoretical heat efficiency can be obtained even for a practically feasible actual compression ratio $\epsilon=5$. Therefore, in the present invention, the variable compression ratio mechanism A is formed so that the expansion ratio becomes 20 or more.

On the other hand, as shown by the broken line in FIG. 9, it is possible to control the intake air amount regardless of the throttle valve 17 even by advancing the closing timing of the intake valve 7 as the engine load becomes lower. Therefore, if expressing the invention so as to cover both the case shown by the solid line and the case shown by the broken line in FIG. 9, in the embodiment according to the present invention, the closing timing of the intake valve 7 is moved in a direction away from the intake bottom dead center BDC as the engine load becomes lower.

Figure 10:
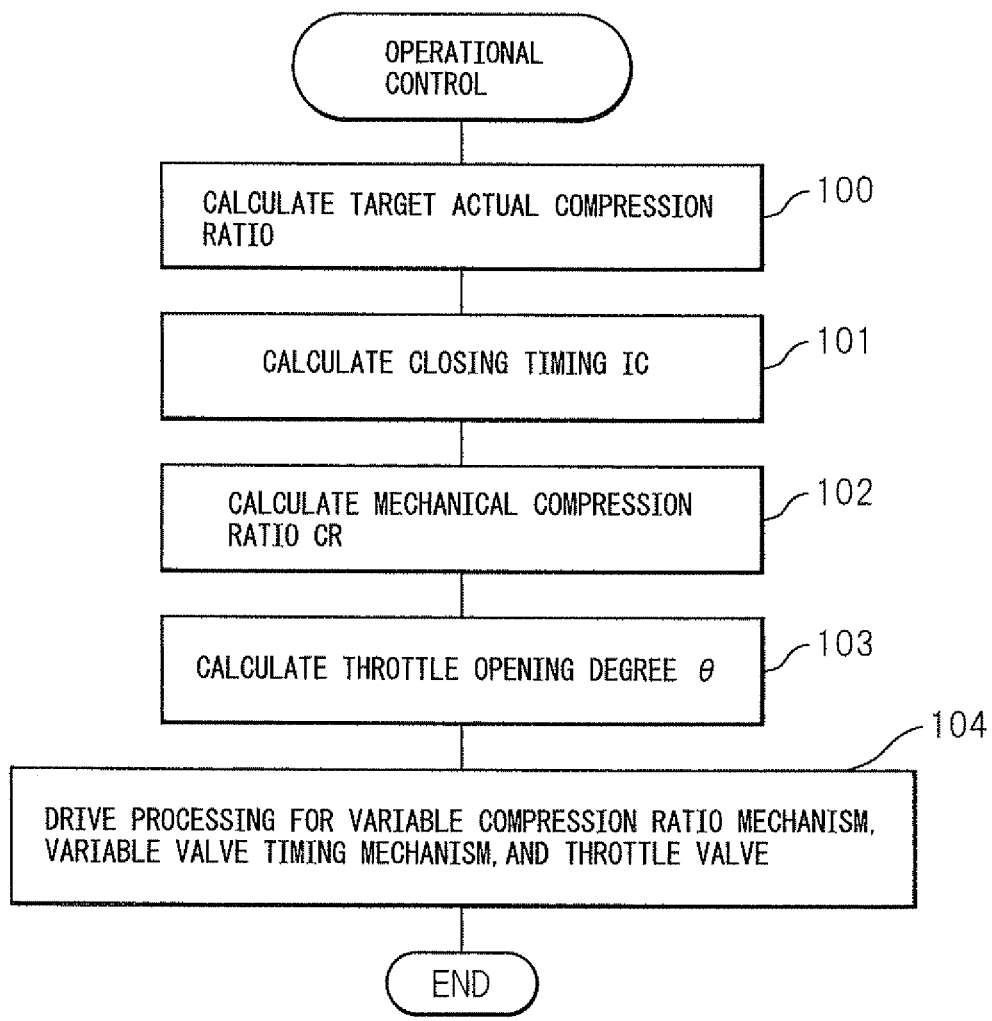
FIG. 10 is a flowchart for operational control.

FIG. 10 shows the operational control routine. Referring to FIG. 10, first, at step 100, the target actual compression ratio is calculated. Next, at step 101, the closing timing of the intake valve 7 IC is calculated from the map shown in FIG. 11(A). That is, the closing timing IC of the intake valve 7 required for supplying the requested intake air amount to the inside of the combustion chamber 5 is stored as a function of the engine load L and engine speed N in the form of a map as shown in FIG. 11(A) in advance in the ROM 32. From this map, the closing timing IC of the intake valve 7 is calculated.

Next, at step 102, the mechanical compression ratio CR is calculated. Next, at step 103, the opening degree of the throttle valve 17 is calculated. The opening degree θ of this throttle valve 17 is stored as a function of the engine load L and engine speed N in the form of a map as shown in FIG. 11(B) in advance in the ROM 32. Next, at step 104, the variable compression ratio mechanism A is controlled so that the mechanical compression ratio becomes the mechanical compression ratio CR, the variable valve timing mechanism B is controlled so that the closing timing of the intake valve 7 becomes the closing timing IC, and the throttle valve 17 is controlled so that the opening degree of the throttle valve 17 becomes the opening degree θ.

LIST OF REFERENCE NOTATIONS

1 . . . crank case
2 . . . cylinder block
3 . . . cylinder head
4 . . . piston
5 . . . combustion chamber
7 . . . suction valve
70 . . . suction valve drive cam shaft
A . . . variable compression ratio mechanism
B . . . variable valve timing mechanism

The invention claimed is:

1. A spark ignition type internal combustion engine, comprising:
   a variable compression ratio mechanism able to change a mechanical compression ratio,
   a variable valve timing mechanism able to control a closing timing of an intake valve,
   a throttle valve arranged in an engine intake passage for controlling an intake air amount, and
   an electronic control unit having control logic which, when executed:
      retards the closing timing of the intake valve in a direction away from an intake bottom dead center as an engine load becomes lower from an engine high load to an engine low load,
      maintains the mechanical compression ratio at a maximum mechanical compression ratio in a load region where the engine load is lower than a predetermined first load,
      decreases the mechanical compression ratio as the engine load becomes higher so that an actual compression ratio becomes constant in a load region where the engine load is higher than the predetermined first load,
      holds the throttle valve in a fully open state in a load region where the engine load is higher than a predetermined second load, which is lower than the predetermined first load,
      decreases an opening degree of the throttle valve as the engine load becomes lower in a load region where the engine load is lower than the predetermined second load, and
      retards the closing timing of the intake valve in a direction away from the intake bottom dead center as the engine load becomes lower in the load region where the engine load is lower than the predetermined second load, and, in a load region where the mechanical compression ratio is maintained at the maximum mechanical compression ratio, the actual compression ratio is lowered as the engine load falls.

2. A spark ignition type internal combustion engine as claimed in claim 1, wherein an expansion ratio at the time of the maximum mechanical compression ratio is 20 or more.

* * * * *